T. B. WRIGLEY.
Nut-Locks.

No. 147,540. Patented Feb. 17, 1874.

ATTEST: INVENTOR: Thos B. Wrigley
By Attorney

UNITED STATES PATENT OFFICE.

THOMAS B. WRIGLEY, OF CHICAGO, ILLINOIS.

IMPROVEMENT IN NUT-LOCKS.

Specification forming part of Letters Patent No. 147,540, dated February 17, 1874; application filed December 22, 1873.

*To all whom it may concern:*

Be it known that I, THOMAS B. WRIGLEY, of Chicago, in the county of Cook and State of Illinois, have invented an Improvement in Nut-Locks, of which the following is a specification:

This invention has for its object to provide a washer and lock which will prevent the nut under which it is applied from unscrewing under vibration, being in this respect particularly adapted for securing the nuts of the track-bolts of rail-joints; and it consists in a washer having a diagonal slot to the left of the bolt-hole, in which is inserted a bar with a projecting stud, which is driven against the side of the nut, after screwing it home, to resist any tendency of the latter to unscrew itself.

Figure 1:
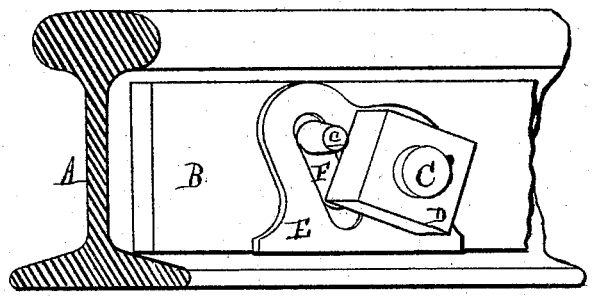
Figure 2:
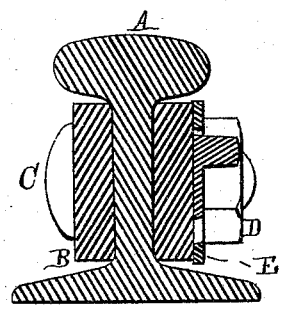
Figure 3:
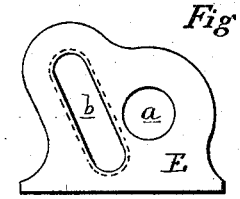
Figure 4:
Figure 5:
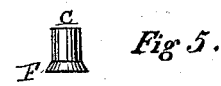

Figure 1 is a perspective view of a rail and fish-plate, showing the manner of using my nut-lock. Fig. 2 is a cross-section at $x$ $x$. Fig. 3 is an elevation of the washer. Fig. 4 is an elevation of the outer face of the locking-bar. Fig. 5 is an end elevation of the same.

In the drawing, A represents a section of a T-rail; B B, the fish-plates at each side thereof; C, a track-bolt, passing through the rail and fish-plates; and D, its nut. E is my washer, having the configuration shown in Fig. 3, with a straight lower edge to bear against the rail-foot to prevent it from turning. $a$ is the bolt-hole, to the left of which is a tapering slot, $b$, milled slightly flaring inwardly, as shown by the dotted lines in Fig. 3. In this slot is inserted, from behind, a bar, F, having beveled edges, which prevent it from falling out of the slot, although it may be moved up and down freely therein. At the top of the bar is a projecting stud, $c$. The washer, with its bar in place, being placed upon the bolt, the bar must be raised to allow the nut to be screwed on, and when the latter is screwed home the bar is driven down the slot until the stud bears against the edge of the nut, the friction of the nut preventing the bar from being moved up the inclined slot by the pressure of the nut against the stud in unscrewing. To unscrew the nut, the bar must be driven up the slot until the stud is tangent to the nut.

What I claim as my invention, and desire to secure by Letters Patent, is—

The herein-described nut-lock, consisting of the washer E, having the diagonal slot $b$, (flaring inwardly,) and the bar F, provided with the stud $c$, which reciprocates in slot $b$, the several parts being constructed and arranged substantially as described and shown.

THOMAS B. WRIGLEY.

Witnesses:
WM. H. LOTZ,
G. E. BUSCHIEK.